(12) United States Patent
Fogarty et al.

(10) Patent No.: US 11,459,135 B2
(45) Date of Patent: Oct. 4, 2022

(54) METHOD AND APPARATUS FOR PACKING PRODUCT IN A TUBULAR CASING

(71) Applicant: Area52 Ltd, Lutes Mountain, CA (US)

(72) Inventors: Tim Fogarty, Moncton (CA); Mike McDougall, Moncton (CA); Joel Devito, Lutes Mountain (CA)

(73) Assignee: AREA52 LTD, Lutes Mountain (CA)

( * ) Notice: Subject to any disclaimer, the term of this patent is extended or adjusted under 35 U.S.C. 154(b) by 22 days.

(21) Appl. No.: 16/887,911

(22) Filed: May 29, 2020

(65) Prior Publication Data

US 2021/0371141 A1 Dec. 2, 2021

(51) Int. Cl.
| | |
|---|---|
| *B65B 9/20* | (2012.01) |
| *B29C 57/10* | (2006.01) |
| *B65B 51/04* | (2006.01) |
| *B65B 51/10* | (2006.01) |
| *B65B 61/06* | (2006.01) |

(52) U.S. Cl.
CPC ............ *B65B 9/2042* (2013.01); *B29C 57/10* (2013.01); *B65B 9/2049* (2013.01); *B65B 51/046* (2013.01); *B65B 51/10* (2013.01); *B65B 61/06* (2013.01)

(58) Field of Classification Search
None
See application file for complete search history.

(56) References Cited

U.S. PATENT DOCUMENTS

| | | | | | |
|---|---|---|---|---|---|
| 3,070,927 | A | * | 1/1963 | Lundahl | B65B 9/14 53/567 |
| 4,947,625 | A | * | 8/1990 | Zike | B65B 9/13 53/567 |
| 7,334,384 | B2 | * | 2/2008 | Nissen | B65B 9/13 53/455 |
| 2013/0203574 | A1 | * | 8/2013 | Cao | B65B 5/022 493/17 |
| 2013/0276414 | A1 | * | 10/2013 | Cao | B65B 9/14 53/574 |

FOREIGN PATENT DOCUMENTS

| | | | | |
|---|---|---|---|---|
| FR | 2243868 A1 | * | 4/1975 | ............ B65B 9/14 |
| GB | 872873 A | * | 7/1961 | ............ B65B 9/12 |

* cited by examiner

*Primary Examiner* — Hemant Desai
*Assistant Examiner* — Tanzim Imam
(74) *Attorney, Agent, or Firm* — Bereskin & Parr LLP

(57) ABSTRACT

A method and apparatus of packing product in a tubular casing is provided. The method includes providing a continuous length of tubular casing, providing an expansion plug within the tubular casing, grasping the casing upstream end with a casing grabber, moving the casing grabber away from the expansion plug towards an outlet end of a product feed conduit, feeding product from the product feed conduit through the casing upstream end into the tubular casing, and cutting the tubular casing downstream of the product to sever an upstream casing segment from the remaining continuous length of tubular casing.

7 Claims, 16 Drawing Sheets

METHOD AND APPARATUS FOR PACKING PRODUCT IN A TUBULAR CASING

FIELD

This application relates to the field of methods and apparatus for packing product in a tubular casing.

INTRODUCTION

Many commercial and industrial processes involve packing product in a tubular casing. The casing may be, for example, elastic netting, sausage casing, or plastic tubing. In some cases, the casing may have an elastic diameter that can stretch to accommodate the product being packed. For example, the product may include food (e.g. a whole or partial crustacean, such as a whole lobster or crab claw; ground meat or sausage filling; or loose fruits and vegetables), or plants (e.g. loose or potted plants).

DRAWINGS

Figure 1:
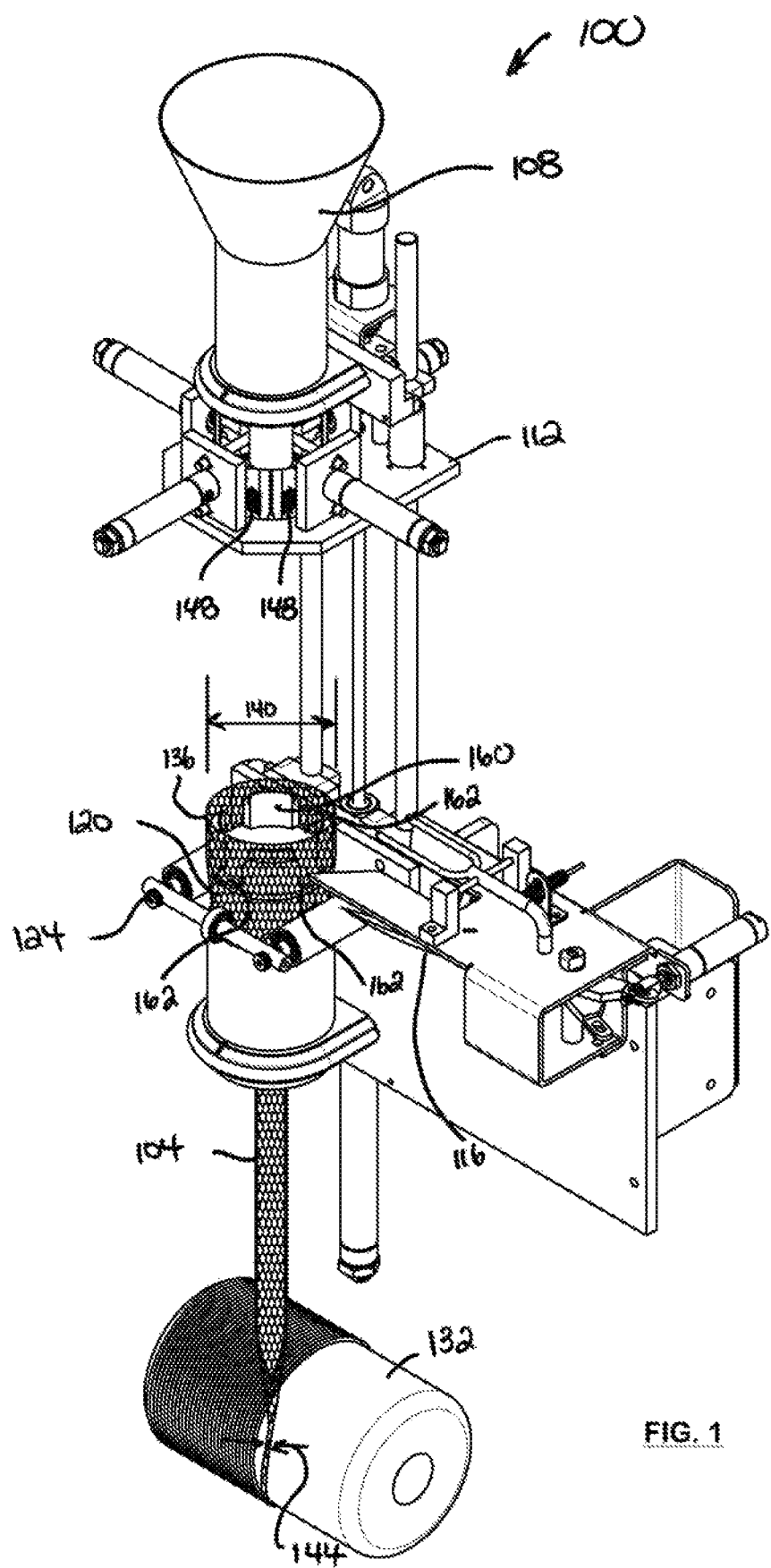
FIG. 1 is a perspective view of a product packing apparatus, with a casing grabber in an upstream position and with grabbing elements in released positions, in accordance with an embodiment.
Figure 8:
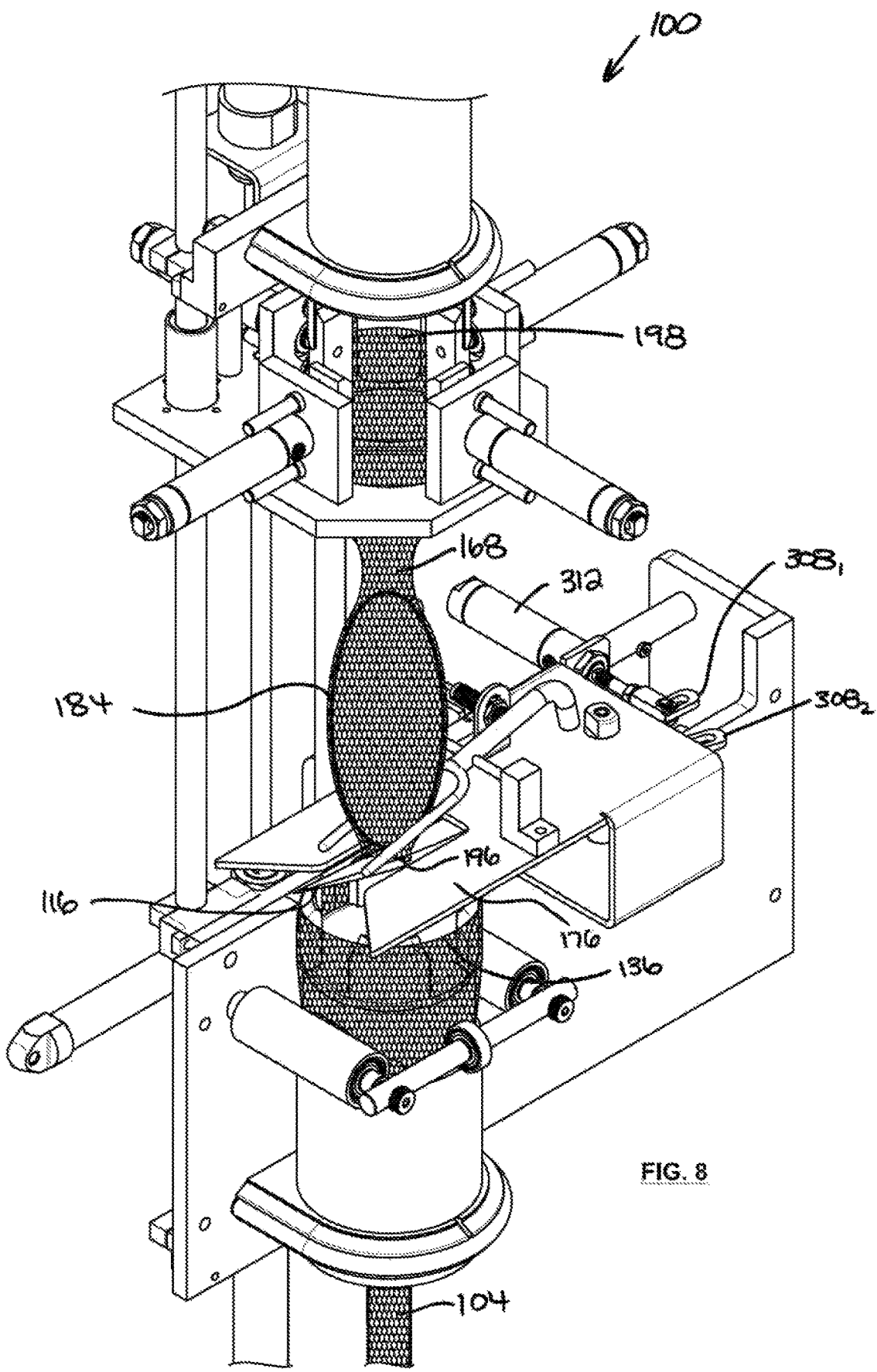
Figure 9:
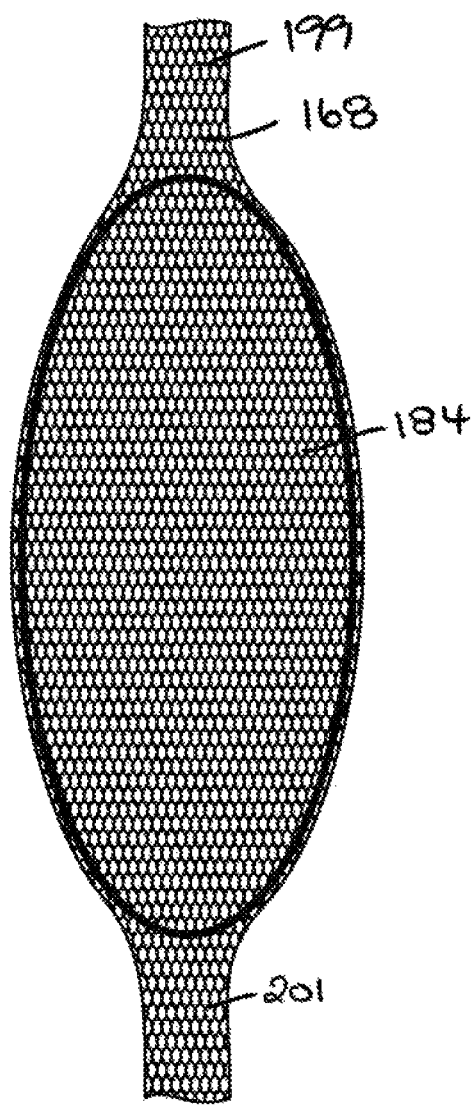
Figure 10:
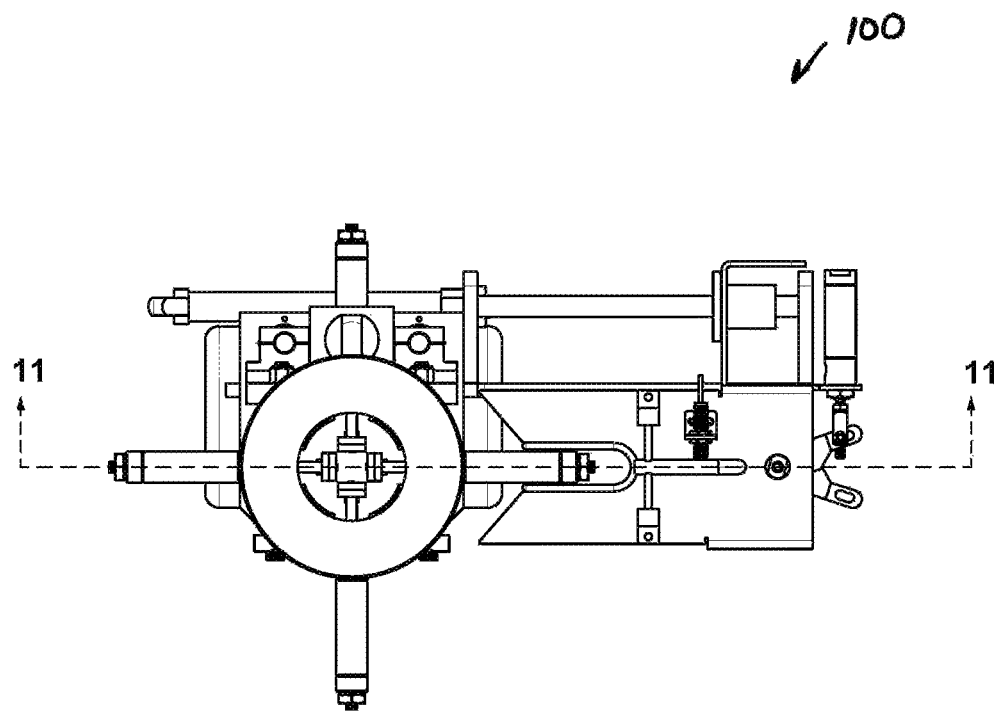
Figure 11:
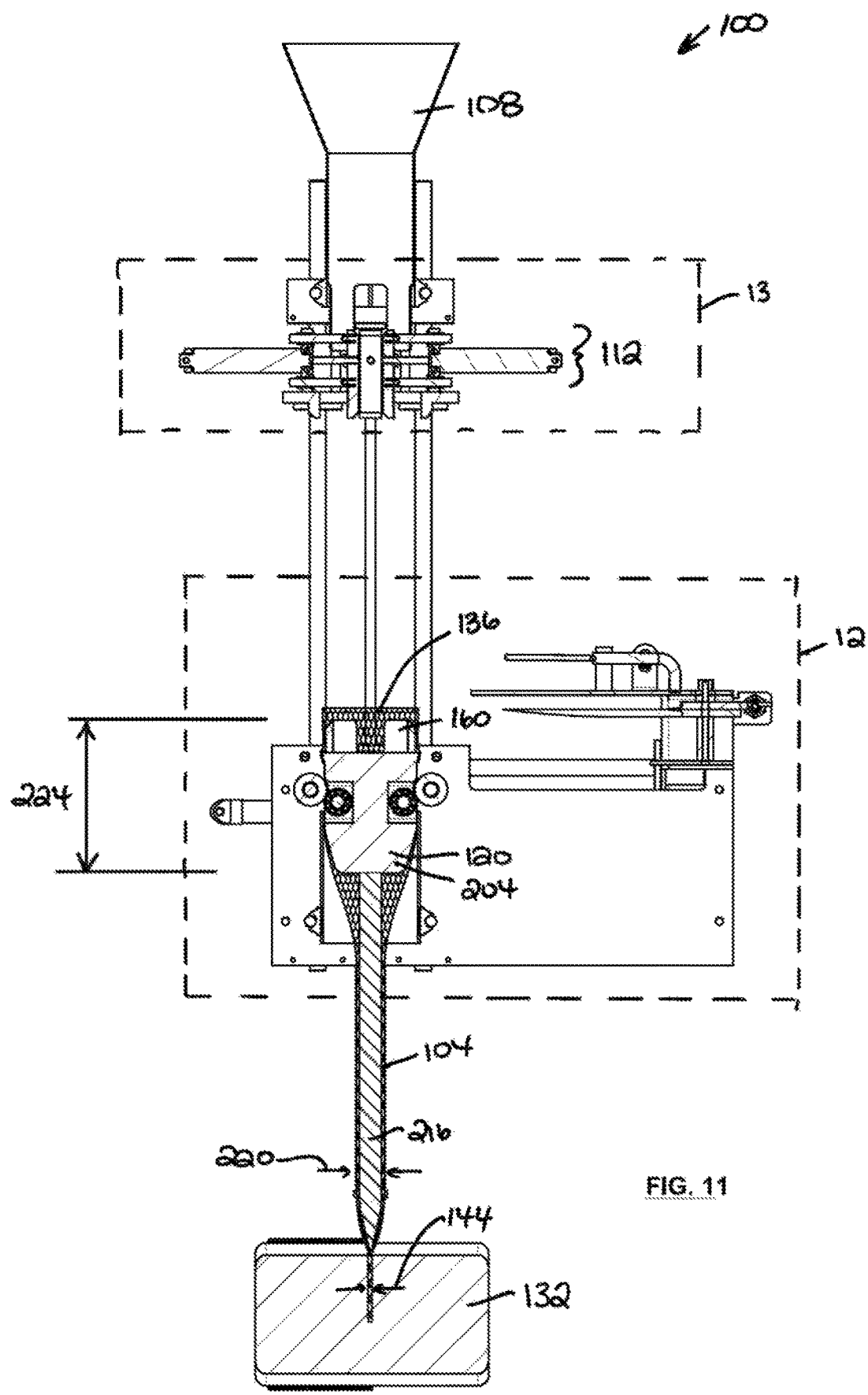
Figure 12:
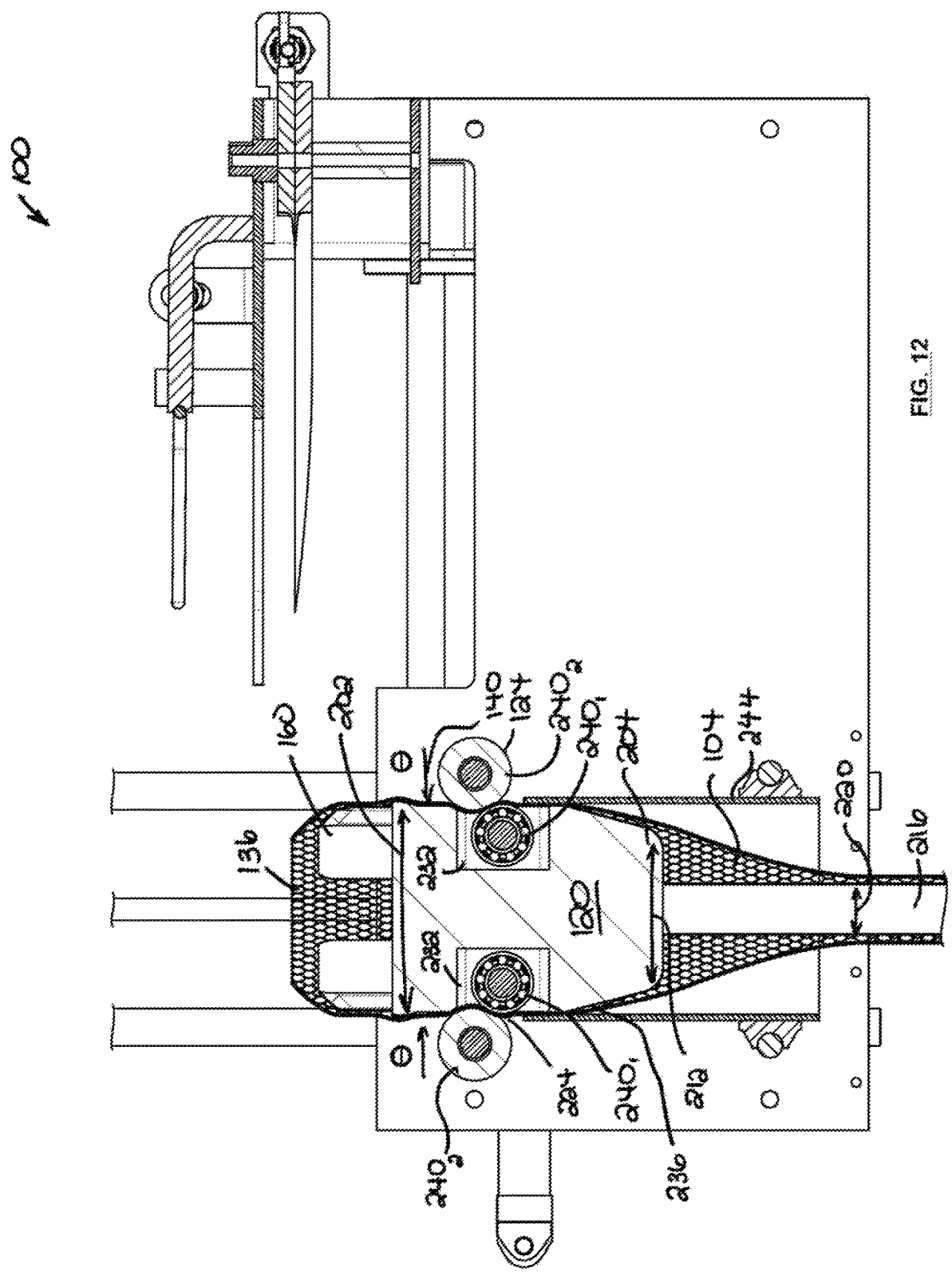
Figure 13:
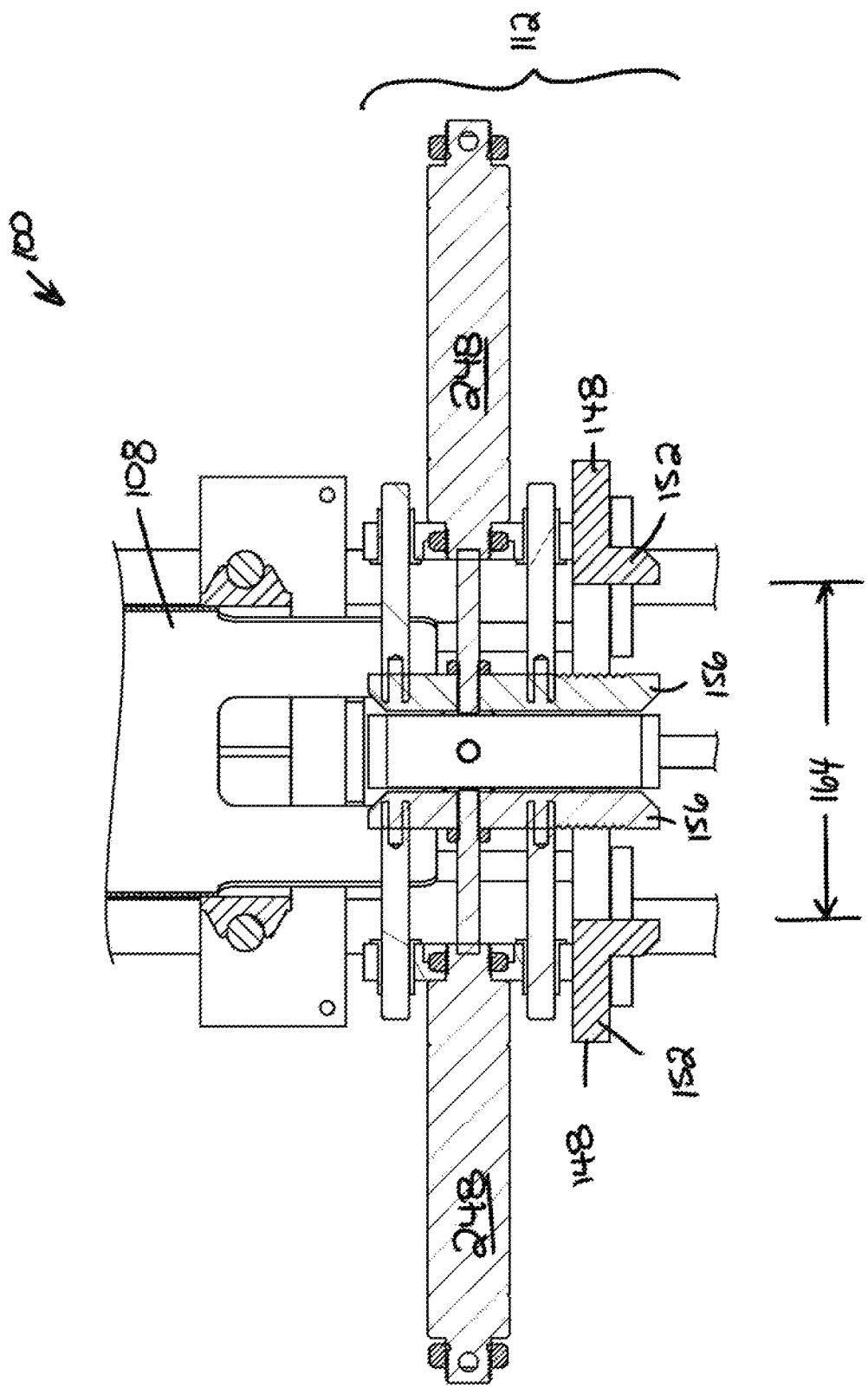
Figure 14:
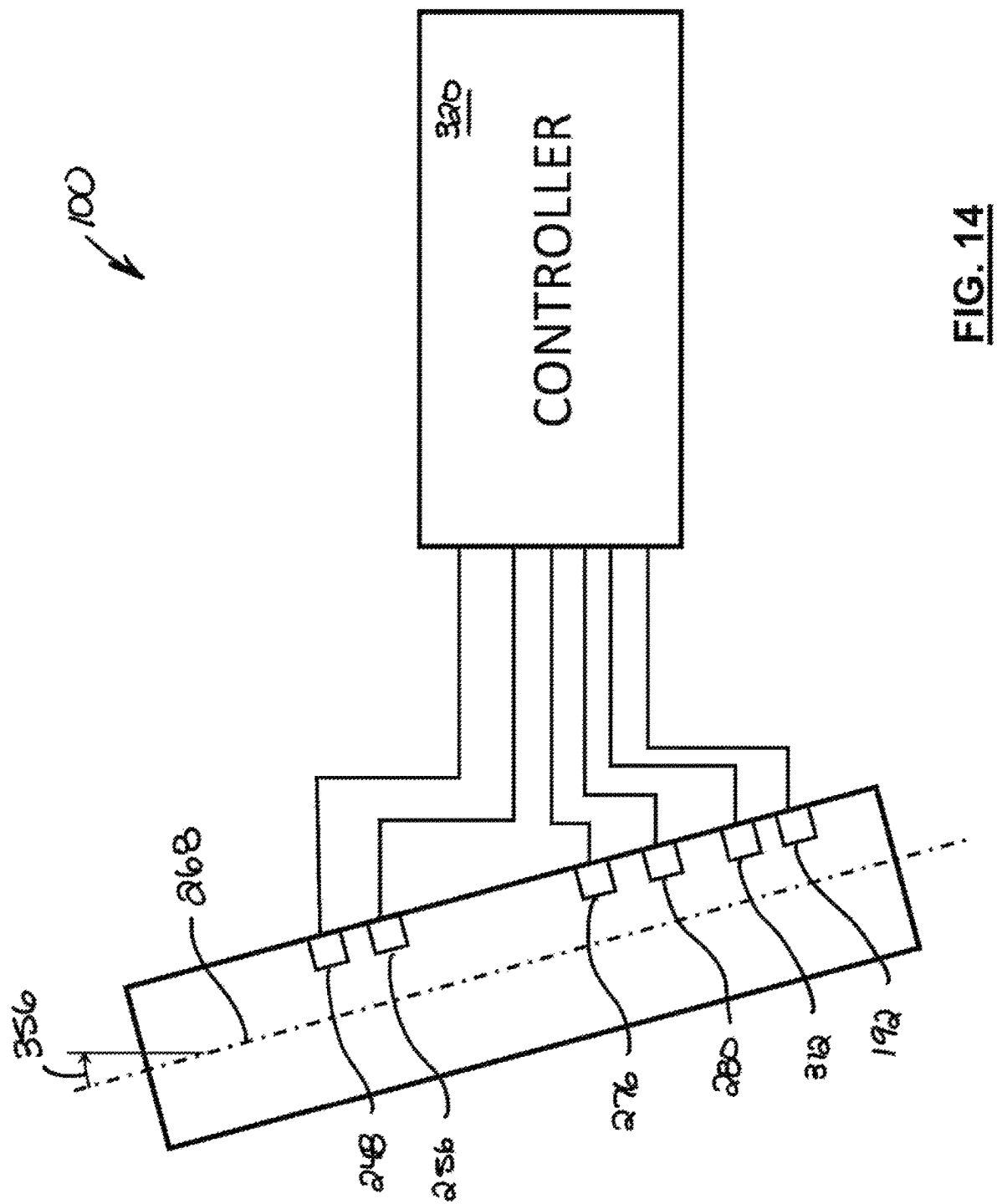
Figure 15:
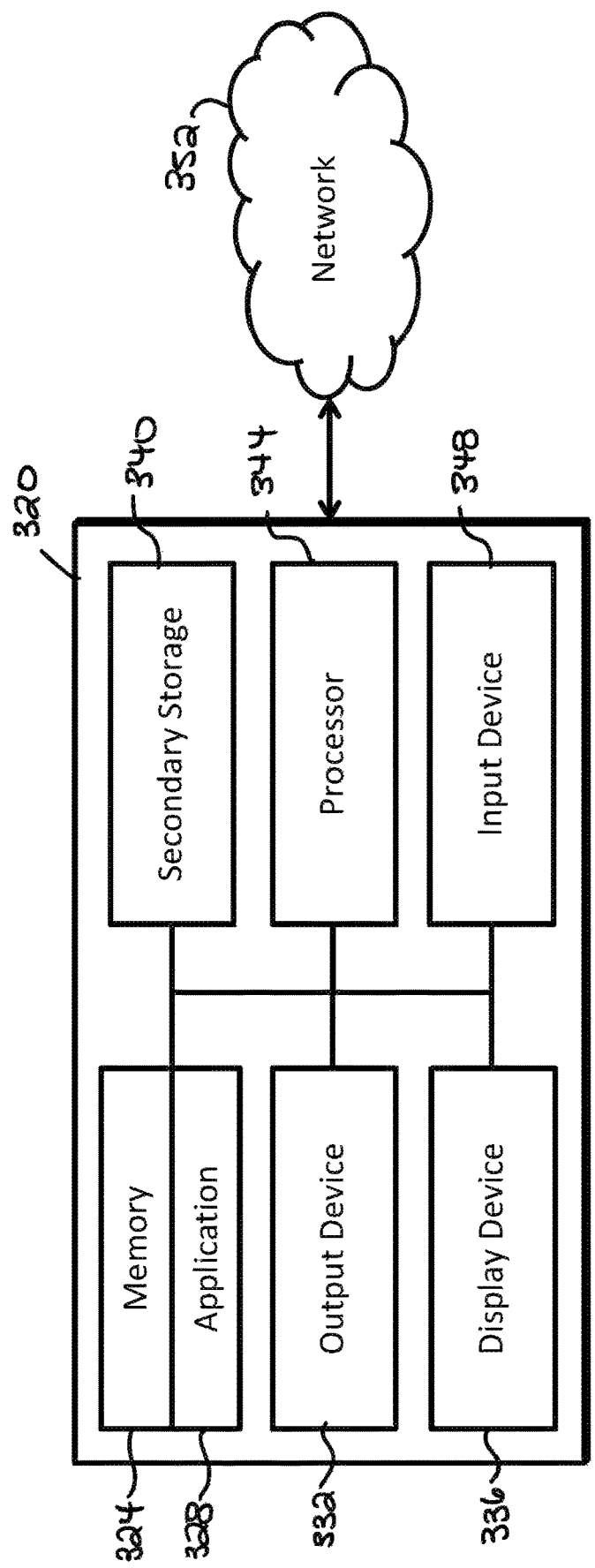
Figure 16:
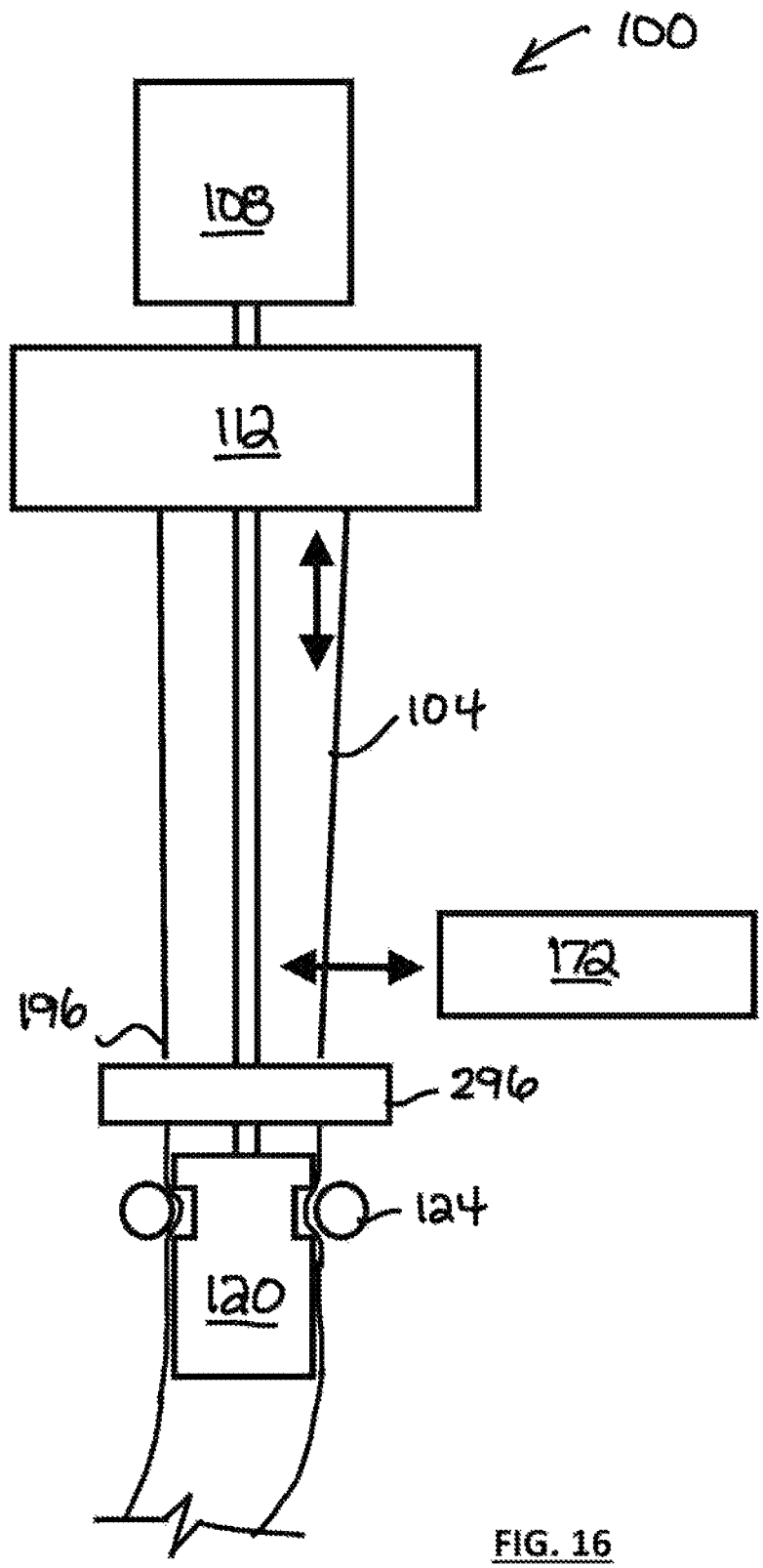

FIG. 8 is a front perspective view of the product packing apparatus of FIG. 1, with the casing grabber retreated from the upstream position, with grabbing elements in grasped positions holding the casing upstream end proximate the product feed conduit, with the finishing assembly in an active position, with a product deposited in the tubular casing, and with a casing segment severed from a remainder of the tubular casing, in accordance with an embodiment;

FIG. 9 is a side elevation view of a severed casing segment with a product inside, in accordance with an embodiment;

FIG. 10 is a top plan view of the product packing apparatus of FIG. 1;

FIG. 11 is a cross-sectional view taken along line 11-11 in FIG. 10;

FIG. 12 is an enlargement of region 12 in FIG. 11;

FIG. 13 is an enlargement of region 13 in FIG. 13;

FIG. 14 is a schematic illustration of a product packing apparatus, in accordance with an embodiment;

FIG. 15 is a schematic illustration of a controller for a product packing apparatus, in accordance with an embodiment; and FIG. 16 is a schematic illustration of a product packing apparatus including a casing closer, in accordance with an embodiment.

SUMMARY

In one aspect, a method of packing product in a tubular casing is provided. The method may include:

a) providing a continuous length of tubular casing, the tubular casing having a casing upstream end;

b) providing an expansion plug within the tubular casing, the expansion plug having a casing discharge end, the casing upstream end located proximate the casing discharge end;

c) grasping the casing upstream end with a casing grabber;

d) moving the casing grabber, with the grasped casing upstream end, away from the expansion plug towards an outlet end of a product feed conduit, the casing grabber holding the casing upstream end open;

e) feeding product from the outlet end of the product feed conduit in a downstream direction through the casing upstream end into the tubular casing, while the casing upstream end is held open by the casing grabber, and f) cutting the tubular casing at a cutting position downstream of the product to sever an upstream casing segment from the remaining continuous length of tubular casing.

In another aspect, a product packing apparatus for tubular casing is provided. The apparatus may include an outer expansion plug retainer, an inner expansion plug, a product feed conduit, a casing grabber, and a casing cutter. The inner expansion plug may be retained by the outer expansion plug retainer. There may be clearance between the inner expansion plug and outer expansion plug retainer to provide accommodation for a tubular casing to pass between the inner expansion plug and outer expansion plug retainer. The product feed conduit may be positioned upstream of the one or more grabber actuators. The casing grabber may be positioned at least in part between the inner expansion plug and the product feed conduit. The casing grabber may include a traversal actuator controllable to move the casing grabber from a downstream position proximate the inner expansion plug to an upstream position proximate the product feed conduit. The casing cutter may be controllable to perform a cutting action at a cutting position located between the inner expansion plug and the product feed conduit.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, $I^2C$, Bluetooth™, or IEEE™ 802.11).

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. $112a$, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Current methods of packing objects in tubular casings involve rucking a continuous length of tubular casing from a spool of casing onto a wide diameter pipe. The tubular casing may be flattened on the spool. Rucking the tubular casing on the pipe may open up the tubular casing from its flattened condition. In the case of tubular casing that has an elastically expansible diameter, rucking the tubular casing on the pipe may also stretch out the diameter of the tubular casing so that it can accept product. After all of the tubular casing is on the wide diameter pipe, then one end of the tubular casing can be pulled to extend a desired length of the tubular casing off the wide diameter pipe. Product can then be fed through the wide diameter pipe into this length of tubular casing. The tubular casing is then cut to separate the length of casing, which now contains the product inside. The new end of the long length of tubular casing on the pipe is pulled again to repeat the process.

In some cases, the tubular casing has an elastically expansible diameter that is normally contracted, and is expanded greatly after rucking onto the wide diameter pipe. When a length of the tubular casing is pulled off the wide diameter pipe, the intention is that the diameter of this length of tubular casing will contract back to its original diameter. However, after rucking, the wide diameter pipe will normally hold enough tubular casing for hundreds of individual cut lengths. Therefore, much of the tubular casing will sit idly on the wide diameter pipe for an extended period (e.g. minutes or hours) before it is finally pulled off the wide diameter pipe to receive the product for packing and finally severed with the product inside.

The extended time spent stretched out over the wide diameter pipe may cause significant elastic fatigue and/or plastic deformation, whereby the relaxed diameter of the tubular casing when pulled off the wide diameter pipe may be far greater than the original relaxed diameter of the tubular casing when it was on the spool prior to rucking. This permanent stretching may interfere with the ability of the tubular casing to tightly conform to the product placed inside of it.

In another aspect, the traditional rucking process can be time consuming. For example, it may take from several minutes for a machine to an hour for a person to ruck an entire spool of tubular casing onto a pipe. This adds substantial labor costs to the packing process.

In another aspect, the traditional rucking process may require an individual to manually pull lengths of tubular casing off the pipe, and sever the length of tubular casing after depositing the product inside. This process too may be labor intensive and add substantial labor costs to the packing process.

Embodiments disclosed herein include methods and apparatus that may mitigate one or more of the problems recited above, and/or provide other advantages. In some embodiments, the methods and apparatus may avoid any necessity for rucking the tubular casing, which may reduce the labor and equipment costs of this activity. In some embodiments, the methods and apparatus may pre-expand the diameter of a short length of elastic tubular casing for only moments (e.g. less than 10 seconds, such as 0.1 to 5 seconds) before severing the length of tubular casing with product inside. This may mitigate elastic fatigue and plastic deformation, allowing the tubular casing to more strongly elastically contract around the contained object. In some embodiments, the method and apparatus may automatically feed and cut the length of tubular casing, which may mitigate the labor required to do so manually.

The operation of an exemplary embodiment of apparatus 100 will now be described with reference to FIGS. 1-9. Afterwards, the function, features, and variations on different aspect of apparatus 100 are described in more detail.

FIG. 1 shows an apparatus 100 for packing product in a tubular casing 104. As shown, apparatus 100 may include a product feed conduit 108, a casing grabber 112, a casing cutter 116, and an inner expansion plug 120 which interfaces with an outer expansion plug retainer 124.

As shown, tubular casing 104 may have a continuous length (e.g. wrapped around a casing spool 132) with a casing upstream end 136. As an example, tubular casing 104 may have a total length of at least 10 meters (e.g. between 10 and 10,000 meters). Inner expansion plug 120 is positioned inside of tubular casing 104 at casing upstream end 136. This allows expansion plug 120 to hold casing upstream end 136 open (i.e. as opposed to flattened) at an expanded casing diameter 140 (and expanded casing circumference). In the case of tubular casing 104 with an elastically expansible diameter, expanded casing diameter 140 may be much greater than the transverse relaxed casing diameter 144 (e.g. on casing spool 132). Tubular casing 104 may be, for example netting, edible casing (e.g. sausage casing), or plastic tubing. Tubular casing 104 may or may not have an elastically extensible diameter. In the illustrated example, tubular casing 140 is illustrated as netting with an elastically expansible diameter.

Figure 2:
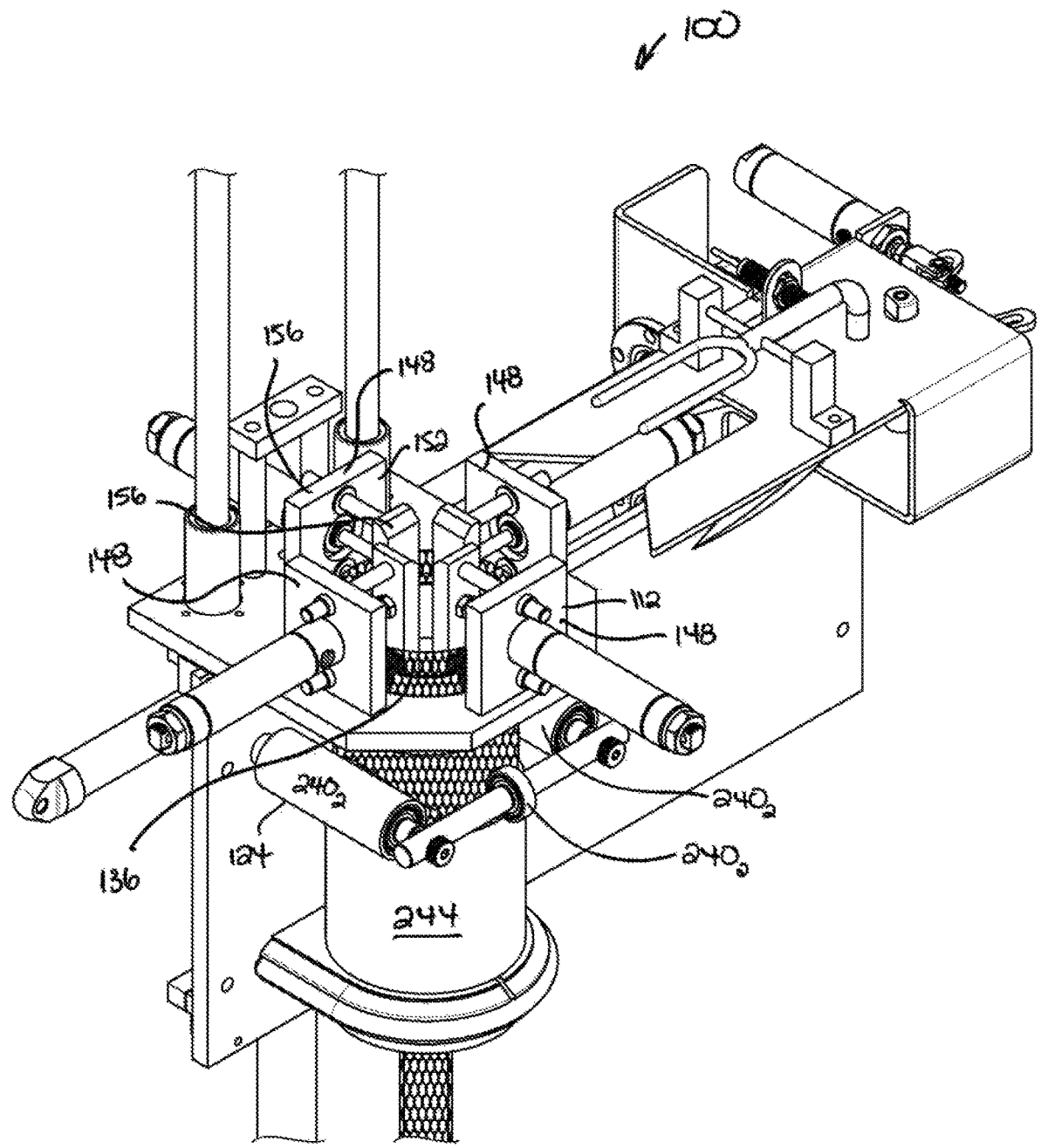
FIG. 2 is a partial perspective view of the product packing apparatus of FIG. 1, with the casing grabber in a downstream position and with grabbing elements in released positions, in accordance with an embodiment.

Turning to FIG. 2, casing grabber 112 is shown in a downstream position (which may be referred to as a 'lowered position' depending on the orientation of apparatus 100). As shown, casing grabber 112 may include one or more grabbing elements 148 positioned in alignment with casing upstream end 136. In the illustrated embodiment, each grabbing element 148 includes a clamp 152 with two jaws 156. Clamp 152 may be activated to move one or both jaws 160 toward the other jaw 156 to grasp (i.e. clamp) a portion of casing upstream end 136. In FIG. 2, casing grabber 112 is positioned so that portions of casing upstream end 136 are aligned between mating jaws 156 of clamps 152 of grabbing elements 148, and clamps 152 are deactivated.

As shown in FIG. 1, an upstream end 160 (also referred to as casing discharge end 160) of inner expansion plug 120 may include one or more recesses 162. Each recess 162 may extend in the downstream direction, and may be positioned in alignment with a grabbing element 148 of casing grabber 112 when casing grabber 112 is in the downstream position (FIG. 2). As shown, portions of casing upstream end 136 that overly a recess 162 are exposed, and this exposure provides clearance for clamps 152 to grasp these portions of casing upstream end 136.

Figure 3:
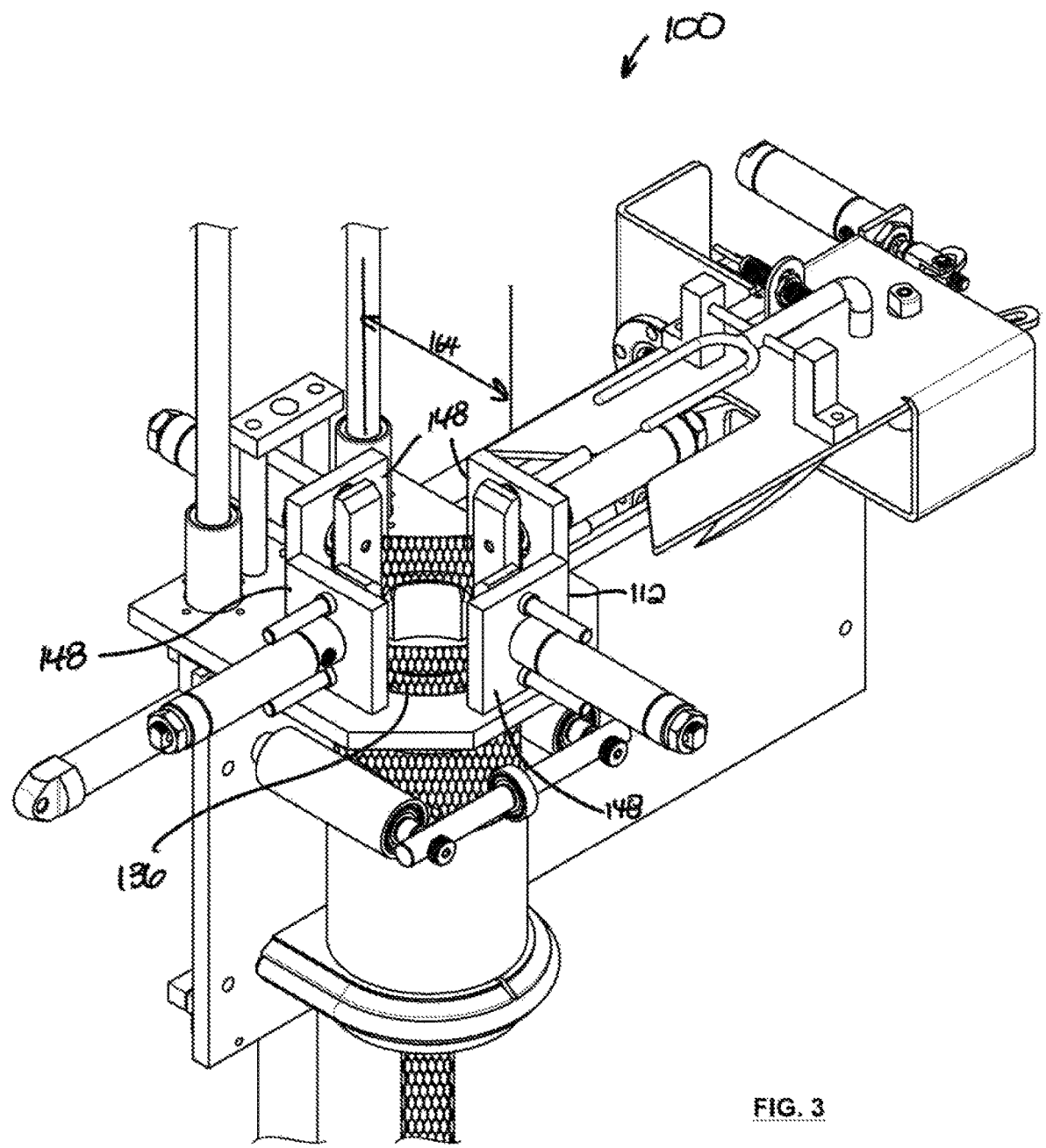
FIG. 3 is a partial perspective view of the product packing apparatus of FIG. 1, with the casing grabber in the downstream position and with grabbing elements in grasped positions, in accordance with an embodiment.

FIG. 3 shows casing grabber 112 in the downstream position, with grabbing elements 148 activated to grasp casing upstream end 136. For example, each clamp 152 may be activated (i.e. the jaws 160 of each clamp moved together) to grasp different portions of casing upstream end 136. Grabbing elements 148 may be shaped and positioned to grasp casing upstream end 136 in a manner that retains casing upstream end 136 open with a transverse grasped diameter 164. In the case of tubular casing 104 with an elastically extensible diameter, transverse grasped diameter 164 may be much greater than (e.g. at least 50% greater than) relaxed casing diameter 144 (FIG. 1).

Figure 4:
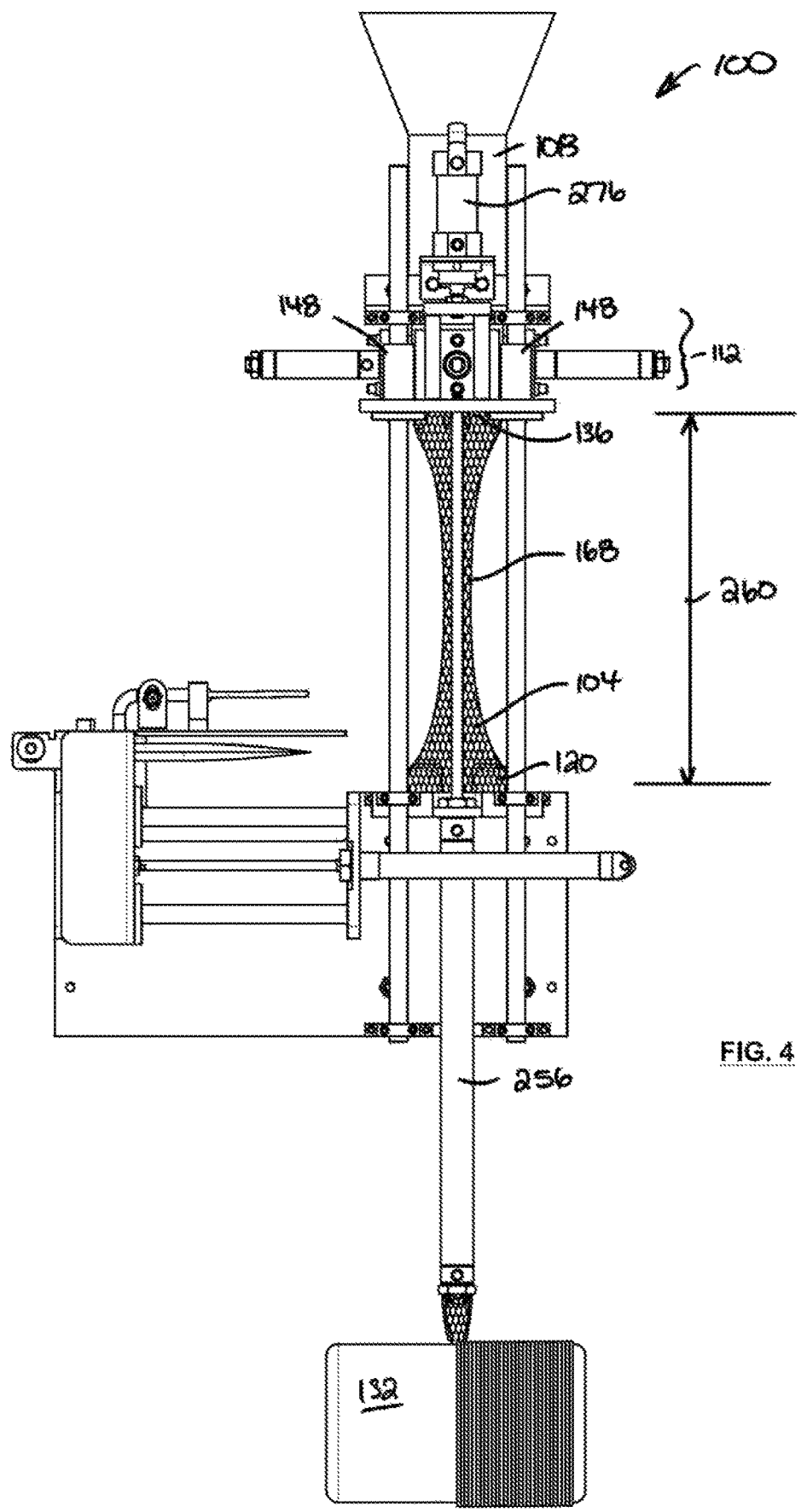
FIG. 4 is a rear elevation view of the product packing apparatus of FIG. 1, with the casing grabber in an upstream position and with grabbing elements in grasped positions holding a casing upstream end proximate a product feed conduit, in accordance with an embodiment.

Turning to FIG. 4, casing grabber 112 has moved away from inner expansion plug 120 to an upstream position proximate product feed conduit 108. Grabbing elements 148 of casing grabber 112 are still activated and still grasping casing upstream end 136, and retaining casing upstream end 136 with transverse grasped diameter 164 (FIG. 3). By moving away from inner expansion plug 120 towards product feed conduit 108, casing grabber 112 has pulled a length 168 of tubular casing 104 (also referred to as can upstream casing segment 168') over and past inner expansion plug 120 to bridge the distance between casing grabber 112 and inner expansion plug 120. The first length 168 may be, for example less than $1/20^{th}$ (e.g. between $1/20^{th}$ and $1/100,000^{th}$) of the continuous length of tubular casing 104 (e.g. wound around casing spool 132). Inner expansion plug 120 may be weighted (e.g. to a weight of between 1 kg and 50 kg), so that it may remain substantially stationary when tubular casing 104 is pulled upstream towards product feed conduit 108.

Figure 5:
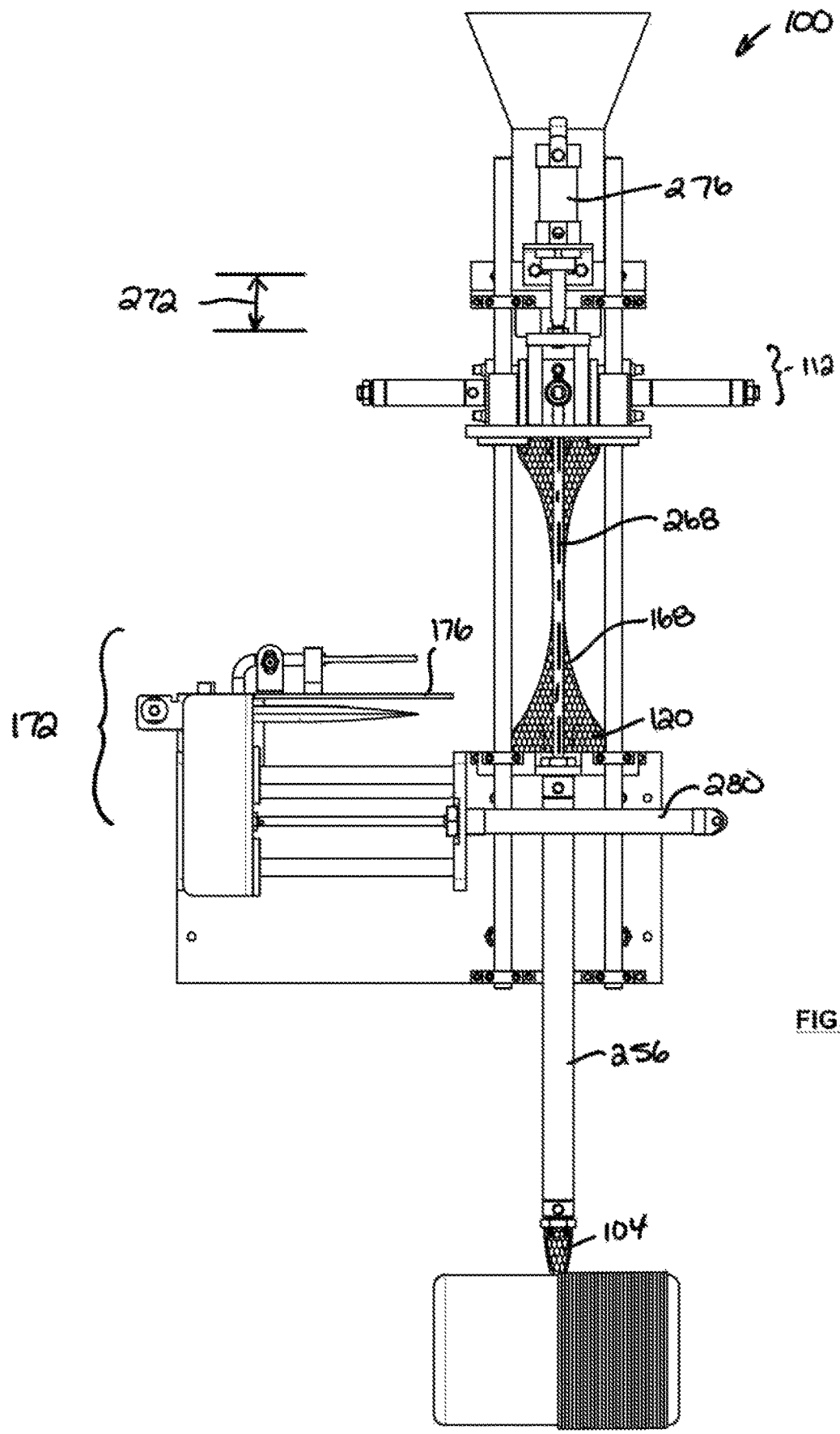
FIG. 5 is a rear elevation view of the product packing apparatus of FIG. 1, with the casing grabber retreated from the upstream position and with grabbing elements in grasped positions holding the casing upstream end proximate the product feed conduit, in accordance with an embodiment.

As shown, in the case of tubular casing 104 with an elastically extensible diameter, tension in upstream casing segment 168 may not permit upstream casing segment 168 to contract to relaxed casing diameter 144 (FIG. 1). Turning to FIG. 5, casing grabber 112 may retreat a short distance (i.e. move a short distance towards inner expansion plug 120) to reduce tension in upstream casing segment 168. This may allow a portion of upstream casing segment 168 to further contract to (or nearly to) relaxed casing diameter 144 (FIG. 1). This may be unnecessary for some tubular casings which have a substantially inelastic diameter (e.g. insufficient elasticity to expand to at least 125% of its relaxed diameter without breaking or plastic deformation).

Figure 6:
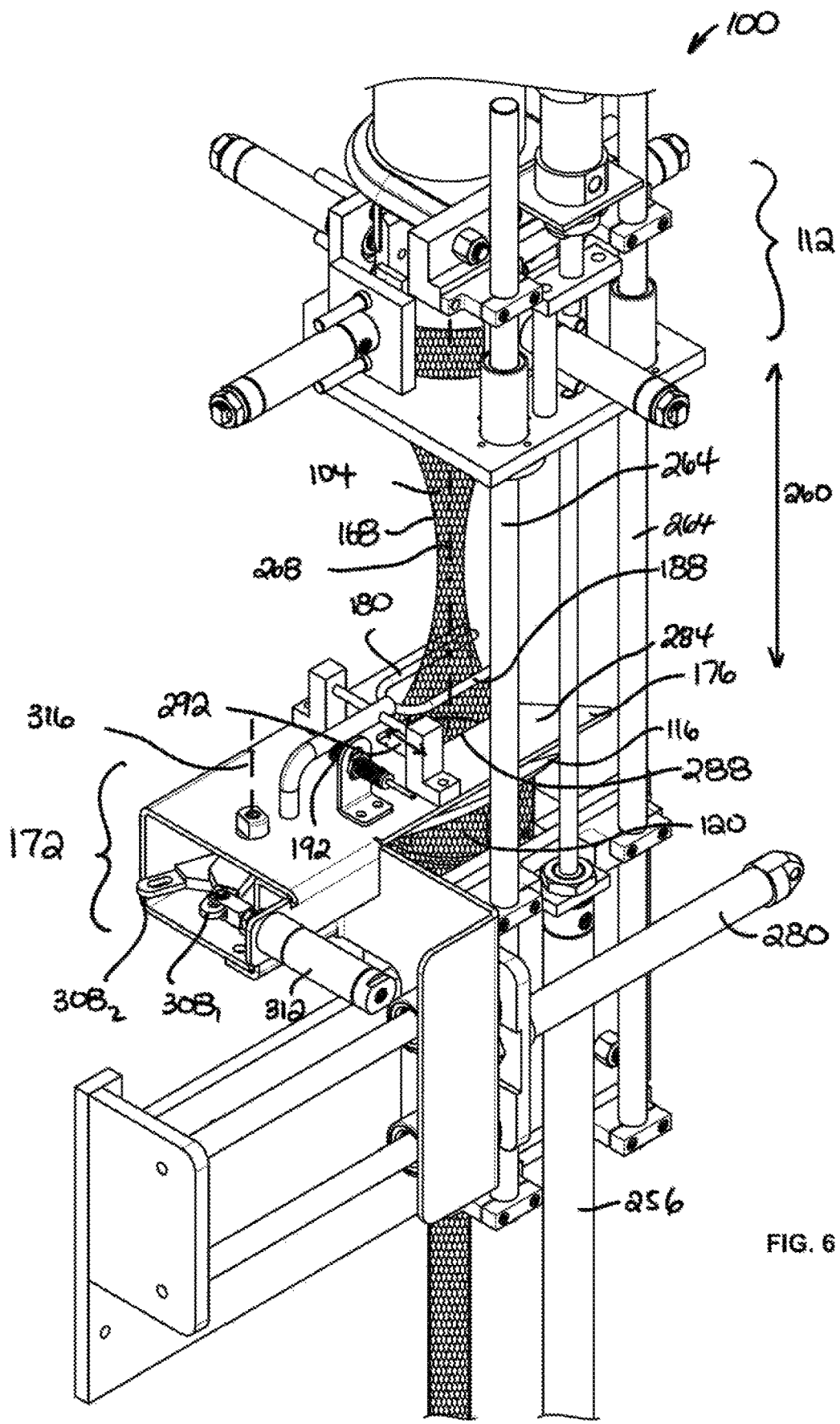
FIG. 6 is a partial rear perspective view of the product packing apparatus of FIG. 1, with the casing grabber retreated from the upstream position, with grabbing elements in grasped positions holding the casing upstream end proximate the product feed conduit, and with the finishing assembly in an active position, in accordance with an embodiment.

FIG. 6 shows a finishing assembly 172 moved into an active position. As shown, finishing assembly 172 may include one or more (or all) of a casing cutter 116, product end stop 176, and a product placement detector 180. Subject to the physical configuration of finishing assembly 172 and its component(s) 116, 176, and/or 180, finishing assembly 172 may at least partially surround upstream casing segment 168 in order to interact with casing segment 168 and/or the product deposited inside. As shown, finishing assembly 172 may be positioned proximate inner expansion plug 120, just downstream of inner expansion plug 120.

Figure 7:
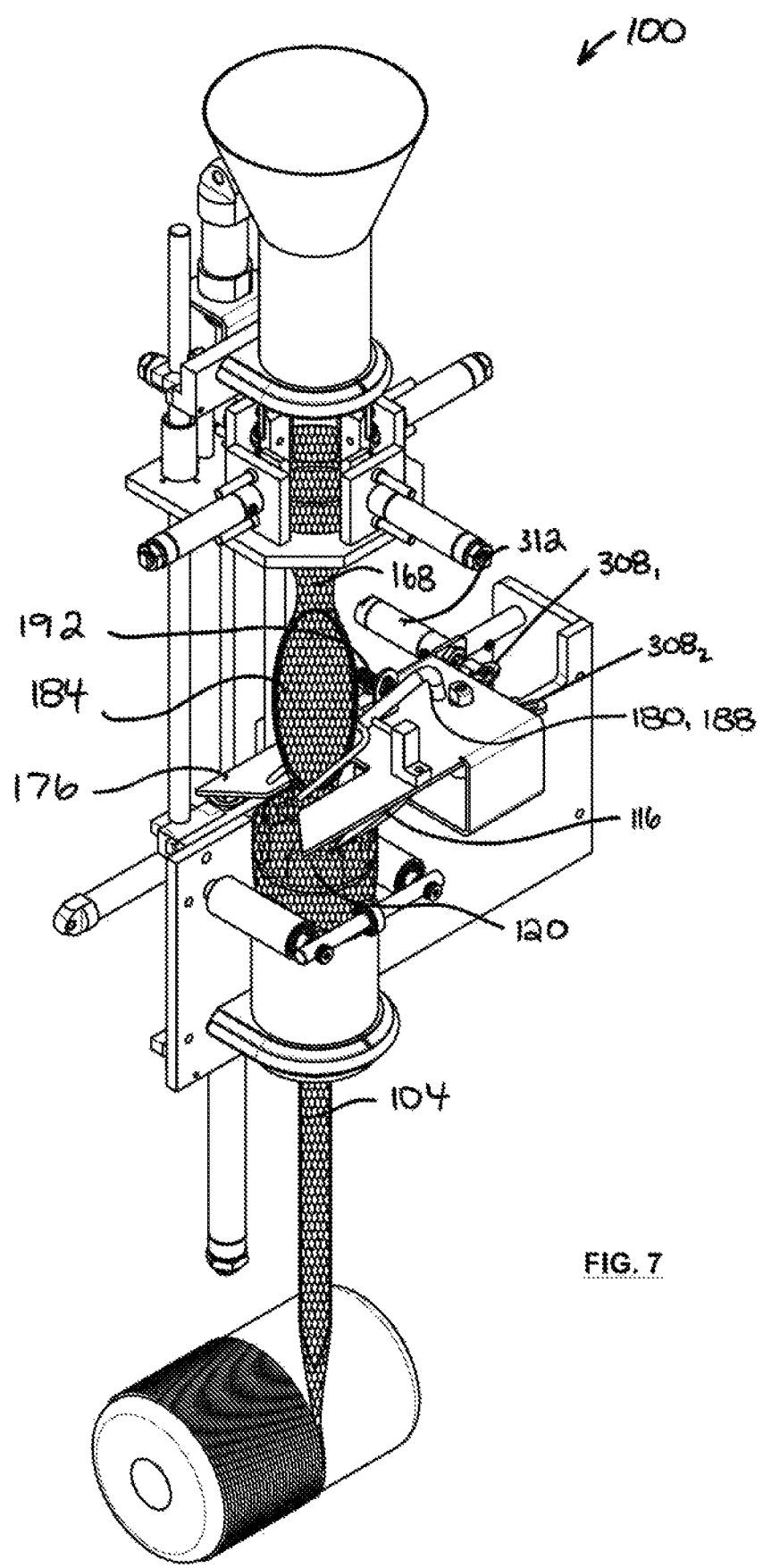
FIG. 7 is a front perspective view of the product packing apparatus of FIG. 1, with the casing grabber retreated from the upstream position, with grabbing elements in grasped positions holding the casing upstream end proximate the product feed conduit, with the finishing assembly in an active position, and with a product deposited in the tubular casing, in accordance with an embodiment.

FIG. 7 shows a product 184 deposited from tubular casing 104 into upstream casing segment 168. As shown, product end stop 176 has impeded downstream movement of product 184. This may retain product 184 upstream of inner expansion plug 120.

The illustrated example also shows that product 184 has interacted with product placement detector 180. As shown, product placement detector 180 may include a bar 188 and a bar sensor 192. Bar 188 may maintain a normal position (FIG. 6) prior to inserting product 184 into upstream casing segment 168, and may move to a displaced position (FIG. 7) by interaction with an inserted product 184. Bar sensor 192 may detect the displacement of bar 188 to its displaced position (FIG. 7). In response, casing cutter 116 may be activated.

FIG. 8 shows casing cutter 116 having been activated to sever a downstream end 196 of upstream casing segment 168 from the remainder of tubular casing 104. As shown, casing cutter 116 may be positioned downstream of product end stop 176 (or 'below' product end stop 176 depending on the orientation of apparatus 100). This allows casing cutter 116 to cut casing segment downstream end 196 at a location which is downstream of product 184, so that product 184 may be positioned fully within upstream casing segment 168 and so that the product 184 does not interfere with the cutting action.

FIG. 9 shows product 184 within a casing segment 168. As shown, in the case of tubular casing with an elastically expansible diameter, casing segment 168 has a transverse diameter that contracts elastically to conform to product 184. Casing segment 168 may include an upstream portion 199 and/or downstream portion 201 that contract to (or nearly to) relaxed casing diameter 144 (FIG. 1). Depending on the degree of elasticity and rigidity, product 184 may not be capable of slipping out of casing segment 168 by gravity alone because the force of gravity is insufficient to expand portion 199 or 201 to the diameter necessary to allow product 184 to pass. Alternatively, or in addition, upstream and/or downstream portions 199, 201 may be closed by a heat seal, clip, or tie applied by a casing closer 296 (FIG. 16).

Referring to FIGS. 11-12, inner expansion plug 120 may be sized and shaped to be positioned within tubular casing 104, and for holding tubular casing 104 open at an expanded casing diameter 140. In the case of tubular casing with an elastically expansible diameter, expanded casing diameter 140 may be at least 50% greater (e.g. 50% to 500% greater) than relaxed casing diameter 144. As shown, inner expansion plug 120 may have a transverse plug diameter 202 corresponding to (e.g. equal to) expanded casing diameter 140. Inner expansion plug 120 may include an upstream casing intake end 204 and a downstream casing discharge end 160. Downstream casing intake end 204 receives tubular casing 104, on demand, from a continuous length of tubular casing 104 (e.g. on a casing spool). Upstream casing discharge end 160 discharges tubular casing 104, on demand, which is pulled away by casing grabber 112.

In some embodiments (and not others), casing intake end 204 of inner expansion plug 120 may have an intake diameter 212 less than expanded casing diameter 140. For example, intake diameter 212 may be less than 50% of expanded casing diameter 140, such as for example less than 25% of expanded casing diameter as shown. This may assist with loading and pulling tubular casing 104 over casing intake end 204.

In some embodiments (and not others), an axially extending alignment post 216 may be connected to casing intake end 204. Alignment post 216 may assist with aligning tubular casing 104 and with mitigating kinks and snags when pulling tubular casing 104 over inner expansion plug 120. As shown, a majority (or entirety) of alignment post 216 may have an alignment post diameter 220 less than expanded casing diameter 140. For example, alignment post diameter 220 may be less than 50% of expanded casing diameter 140, such as for example less than 25% of expanded casing diameter as shown. In the case of tubular casing with an elastically expansible diameter, this may mitigate tubular casing 104 experiencing elastic fatigue and plastic deformation by avoiding unnecessarily stretching the diameter of tubular casing 104.

In use, inner expansion plug 120 is wholly positioned within tubular casing 104. However, unlike a wide-diameter pipe used when rucking, a vast majority of the tubular casing 104 is not positioned on inner expansion plug 120. Instead, only a discrete length of tubular casing 104 corresponding to a longitudinal length 224 of inner expansion plug 120 is on inner expansion plug 120. The remainder of tubular casing 104 remains downstream of casing intake end 204, and is fed onto inner expansion plug 120 via casing intake end 204 on demand as casing grabber 112 pulls casing upstream end 136 away from inner expansion plug 120. In the case of tubular casing having an elastically extensible diameter, an advantage of this design is that tubular casing 104 maintains a relaxed diameter except for a very short time (e.g. seconds) when it is pulled over inner expansion plug 120, pulled towards product feed conduit 108, before a product is deposited inside. Longitudinal length 224 may be between 10% and 200% (e.g. between 10% and 100%) of the length of upstream casing segment 168. Longitudinal length 224 may be for example less than $1/20^{th}$ (e.g. between $1/20^{th}$ and $1/100,000^{th}$) of the continuous length of tubular casing 104 (e.g. wound around casing spool 132).

In contrast, rucking entails bunching up an entire continuous length of tubular casing (typically netting) on a wide diameter pipe, which requires time and/or equipment, which translates to costs. In the case of tubular casing having an elastically extensible diameter, it also means all of the tubular casing is held at the expanded diameter until it is finally discharged with product inside. Some of the tubular casing may thus be held at the expanded diameter for hours, which may cause elastic fatigue and plastic deformation which impedes the tubular casing from retracting to its original relaxed diameter.

Referring to FIGS. 2 and 12, inner expansion plug 120 may be retained in position by an outer expansion plug retainer 124. In use, outer expansion plug retainer 124 remains outside of the tubular casing 104. As shown, tubular casing 104 may move through a gap 224 (also referred to as a casing clearance 224) between inner expansion plug 120 and outer expansion plug retainer 124. Gap 224 may provide an annular passage that provides space for tubular casing 104 to pass.

Outer expansion plug retainer 124 can have any design suitable to retain the position of inner expansion plug 120 (e.g. prevent inner expansion plug 120 from falling away into tubular casing 104 or from being carried upstream when casing grabber 112 pulls tubular casing 104 towards product feed conduit 108 (FIG. 1)). For example, outer expansion plug retainer 124 may include one or many retainer bearings 2402 (e.g. rollers) that interface with an exterior 236 of inner expansion plug 120 to substantially inhibit inner expansion plug 120 from moving upstream or downstream. Clearance 224 may allow for a small amount of play, particularly when tubular casing 104 is not loaded around inner expansion plug 120. As shown, retainer bearings 2402 may slightly protrude into transverse recesses 232 formed in an exterior 236 of inner expansion plug 120. Accordingly, attempted lateral movements of inner expansion plug 120 (e.g. downstream and/or upstream) may be impeded by interference between retainer rollers 2402 and plug exterior 236.

In some embodiments, inner expansion plug 120 and/or outer expansion plug retainer 124 may be designed to reduce friction on tubular casing 104 as tubular casing 104 is pulled through casing clearance 224. This may reduce the longitudinal force required for casing grabber 112 to pull tubular casing 104 upstream, which may reduce longitudinal tension on tubular casing 104 and mitigate damage (e.g. tearing or plastic deformation) to tubular casing 104. In some embodiments, one or both of inner expansion plug 120 and outer expansion plug retainer 124 may include bearings 240. For example, bearings 240 may be roller bearings with rotating elements. In the illustrated example, inner expansion plug 120 comprises bearings 2401 and outer expansion plug comprises bearings 2402. Tubular casing 104 may be pinched at the interfaces of bearings 2401 on bearings 2402. When tubular casing 104 is pulled upstream by casing grabber 112, bearings 240 may roll so that resistance and tension on tubular casing 104 is reduced as compared with not having bearings 240.

Still, in other embodiments, one or both of inner expansion plug 120 and outer expansion plug retainer 124 may not have bearings 240. Instead, tubular casing 104 may drag across the surfaces at the interface of inner expansion plug 120 and outer expansion plug retainer 124. This omission of bearings 240 may reduce the cost of apparatus 100. Depending on the strength and surface friction characteristics of tubular casing 104, the increase in friction when pulling may be minimal or may not result in damage to tubular casing 104. For tubular casing which is netting, it is preferred to have bearings 240.

Still referring to FIGS. 2 and 12, apparatus 100 may include in some embodiments (and not others) a plug alignment guide 244. Plug alignment guide 244 may help maintain the axial alignment of inner expansion plug 120. As shown, at least a portion of inner expansion plug 120 may be positioned within plug alignment guide 244. Since inner expansion plug 120 is located wholly within tubular casing 104, it may be prone to rotating off-axis which may interfere with the ability for tubular casing 104 to be pulled over it.

Tubular casing 104 may extend through an interior of plug alignment guide 244 and inner expansion plug 120 may be wholly positioned within tubular casing 104. In the illustrated example, plug alignment guide 244 is sized larger than the received portion of inner expansion plug 120. This allows plug alignment guide 244 to be spaced apart from the received portion of inner expansion plug 120 to provide clearance for tubular casing 104 to pass. Depending on the size of the clearance, this may permit tubular casing 104 to be pulled upstream (i) without any frictional contact with plug alignment guide 244, or (ii) with minimal frictional contact with plug alignment guide 244.

Reference is now made to FIGS. 1 and 13. Casing grabber 112 can have any design suitable for grasping casing upstream end 136 and pulling casing upstream end 136 away from inner expansion plug towards product feed conduit 108. Casing grabber 112 may have one or more grabbing elements 148. Each grabbing element 148 can have any design suitable for gasping casing upstream end 136. In the illustrated example, each grabbing element 148 includes a clamp 152. As shown, grabbing elements 148 may be circumferentially distributed to define a transverse grasped diameter 164. For example, grabbing elements 148 may be circularly distributed as in the illustrated example to hold the casing upstream end 136 open (as opposed to its flattened condition on the spool). In the case of tubular casing with an elastically extensible diameter, grasped diameter 164 may be substantially greater than the relaxed casing diameter 144. For example, grasped diameter 164 may be at least 50% greater than the relaxed casing diameter 144.

Each clamp 152 can have any design suitable for grasping casing upstream end 136. For example, each clamp 152 may have at least one actuated jaw 156. Grabbing element(s) 152 may be actuated to move grabbing element(s) 152 between a grasped position (FIG. 3) in which grabbing element(s) 152 grasp tubular casing 104 and a released position (FIG. 13) in which grabbing element(s) 152 release tubular casing 104 from its grasp. Grabbing element(s) 152 may be actuated in any manner, such as for example by one or many actuators 248. Many grabbing elements 152 may be driven by a common actuator 248, all grabbing elements 152 may be driven by a different actuator 248, or there may be more actuators 248 than the number of driven grabbing elements 152. Grasping actuators 248 may include electrical actuators (e.g. electric motor or solenoid). Alternatively or in addition, actuators 248 may include fluidic actuators as shown (e.g. pneumatic or hydraulic piston cylinders, or a pneumatic or hydraulic motor).

Casing grabber 112 may include any number of grabbing elements 148. For example, casing grabber 112 may include 1 to 20 grabbing elements 148 (e.g. 2-8 grabbing elements, such as 4 grabbing elements 148 as shown). In the illustrated example, each grabbing element 148 is movable between its grasped position and released position by a respective fluidic actuator 248.

Referring to FIG. 6, casing grabber 112 may move between its downstream position (FIG. 3) and its upstream position (FIG. 6) across a traversal length 260 in any manner suitable to pull tubular casing 104. For example, casing grabber 112 may include a traversal actuator 256. Traversal actuator 256 may be, for example an electric actuator (e.g. electric motor or electric solenoid, such as to drive a pulley, geared connection, or screw) or a fluidic actuator (e.g. pneumatic or hydraulic piston cylinder or motor). The illustrated example shows traversal actuator 256 as a fluidic cylinder. Traversal length 260 may be for example less than $1/20^{th}$ (e.g. between $1/20^{th}$ and $1/100,000^{th}$) of the continuous length of tubular casing 104 (e.g. wound around casing spool 132).

In some embodiments (and not others), casing grabber 112 may include one or more guide rails 264. As shown, guide rails 264 may extend longitudinally parallel to traversal axis 268 to help maintain casing grabber 112 axially aligned when moving between the downstream position and upstream position.

Reference is now made to FIGS. 4-5. In some embodiments (and not others), casing grabber 112 may be configured to retreat from its upstream position (FIG. 4) a short distance 272 (e.g. 5% to 50% of traversal length 260, such as for example 5% to 25% of traversal length 260) to reduce tension in upstream casing segment 168. Casing grabber 112 may retreat in any suitable manner. For example, traversal actuator 256 may actively reverse to move casing grabber 112 downstream by the retreat distance 272. Alternatively or in addition, apparatus 100 may include a separate retreat actuator 276 (also referred to as a 'relax actuator' 276) as shown. In the illustrated example, retreat actuator 276 may be activated to move casing grabber 112 downstream against the bias of traversal actuator 256. Retreat actuator 276 may have any design suitable for moving casing grabber 112 downstream by the retreat distance 272. For example, retreat actuator 276 may include an electric actuator (e.g. electric motor or electric solenoid, such as to drive a pulley, geared connection, or screw) or a fluidic actuator (e.g. pneumatic or hydraulic piston cylinder or motor). In the example shown, retreat actuator 276 is sized to generate greater driving force than traversal actuator 252 so that retreat actuator 276 can overpower traversal actuator 252 to move casing grabber 112 downstream against the bias of traversal actuator 256.

Reference is now made to FIGS. 5-6. In some embodiments (and not others), finishing assembly 172 may be movable between an active position (FIG. 6) in which elements of finishing assembly 172 may be positioned to interact with tubular casing 104, and an inactive position (FIG. 5) in which elements of finishing assembly 172 may be positioned so they do not (or cannot) interact with tubular casing 104. For example, finishing assembly 172 may be movable transversely to traversal axis 268 (e.g. in a direction that is within 45 degrees of perpendicular to traversal axis 268) between the active position (FIG. 6) and inactive position (FIG. 5). In the example shown, finishing assembly 172 is movable towards traversal axis 268 to the active position, and movable away from traversal axis 268 to the inactive position.

Finishing assembly 172 may be movable between active and inactive positions in any suitable manner. For example, finishing assembly 172 may include a traversal actuator 280. Traversal actuator 280 may include an electric actuator (e.g. electric motor or electric solenoid, such as to drive a pulley, geared connection, or screw) or a fluidic actuator (e.g. pneumatic or hydraulic piston cylinder or motor). In the illustrated example, traversal actuator 280 includes a fluidic piston cylinder.

Referring to FIG. 6, in some embodiments (and not others), finishing assembly 172 may include a product end stop 176. Product end stop 176 may act to impede the upstream (longitudinal) movement of a deposited product. For example, product end stop 176 may inhibit a deposited product 184 from traveling beyond casing cutter 116, so that the deposited product 184 may be fully contained within the casing segment 168 when it is severed—as shown in FIG. 9, and so that casing cutter 116 has clearance to cut tubular casing 104 without obstruction by the deposited product 184.

The shape of product end stop 176 may be selected based on the characteristics of tubular casing 104 (e.g. diameter elasticity) and the characteristics of the intended product (e.g. shape and size). In the illustrated embodiment, product end stop 176 comprises a platform 284 having casing slot 288 that receives tubular casing 104 (i.e. that provides passage for tubular casing 104) when finishing assembly 172 is in the active position. Casing slot 288 may have a transverse diameter 292 sized to impede passage of a product within tubular casing 104.

Still referring to FIG. 6, in some embodiments (and not others), finishing assembly 172 may include a product placement detector 180. Product placement detector 180 may have any design suitable to detect when a product has been fully inserted into tubular casing 104. For example, product placement detector 180 may include one or more or all of a vision-based sensor (e.g. optical sensor that visually monitors the position of a product), a beam break sensor, a temperature-based sensor (e.g. infrared sensor), a time of flight sensor, a hall effect sensor, a circuit break sensor. Product placement detector 180 may include a non-contact sensor and/or a contact-based sensor.

In the illustrated example, product placement detector 180 comprises a movably mounted bar 188 and a sensor 192 (e.g. hall effect sensor). In use, when finishing assembly 172 is in the active position, bar 188 (illustrated as having a fork shape) may be positioned to interact with product deposited into tubular casing 104. For example, bar 188 may at least partially surround a downstream portion of tubular casing 104, at a position upstream of product end stop 176. As shown in FIG. 7, a deposited product 184 may act upon bar 188, causing bar 188 to move from its normal position. Movement sensor 192 may detect this change in position of bar 188. As discussed further below, a movement sensor 192 may be communicatively coupled to a controller, and the controller may direct further activity (e.g. activation of casing cutter 116) based at least in part on a signal from product placement detector 180 (e.g. from movement sensor 192) indicating that a product 184 has been fully inserted into tubular casing 104 (e.g. that a downstream end of the product is proximate expansion plug 120).

Reference is now made to FIGS. 6-8. In some embodiments, finishing assembly 172 may include a casing cutter 116. Casing cutter 116 may have any design suitable for severing tubular casing 104 to form an upstream casing segment 168 holding product 184. In particular, casing cutter 116 may cut segment downstream end 196 whereby casing segment 168 may extend from segment downstream end 196 to segment upstream end 198. The remaining tubular casing 104, still continuous with the length of tubular casing wound around the casing spool, may have a new upstream end 136 where segment downstream end 196 was cut.

In some embodiments, casing cutter 116 may include one or more blades 308 which are actuatable to cut tubular casing 104 downstream of a contained product 184. For example, casing cutter 116 may include two blades 308 as shown, at least one of which is movable relative to the other to shear tubular casing 104. In various embodiments, blades 308 may include one or more of a rotary blade, a knife (as shown), a saw, a reciprocating blade, a hot wire cutter, hot knife, and the like. As shown, casing cutter 116 may be located downstream of one or both of product end stop 176 and product placement detector 180.

In the example shown, casing cutter 116 comprises a pair of cutting blades 308, one of which is actuated to create cutting shear with the other. For example, casing cutter 116 may include a cutting actuator 312. Cutting actuator 312 may have any design suitable for moving blade(s) 308 in a manner that causes blade(s) 308 to sever tubular casing 104. For example, cutter actuator 312 may include an electric actuator (e.g. electric motor or electric solenoid, such as to drive a pulley, geared connection, or screw) or a fluidic actuator (e.g. pneumatic or hydraulic piston cylinder or motor). In the illustrated example, cutter actuator 312 includes a fluidic piston cylinder. FIG. 8 shows an example where blade 3081 is pivotably connected to finishing assembly 172 at a blade axis 316, and activating cutter actuator 312 (FIG. 8) rotates blade 3081 about blade axis 316 relative to blade 3082 (e.g. in the manner of scissors), whereby a cutting shear is applied to tubular casing 104.

Referring to FIG. 16, in some embodiments (and not others), apparatus 100 may further comprise a casing closer 296 which when activated closes tubular casing 104 at or upstream of where casing cutter 116 (FIG. 6) cuts segment downstream end 196. For example, the casing closer may comprise a heat sealer, zip tie applicator, clip applicator, or twist tie applicator. Alternatively or in addition, casing cutter 116 (FIG. 6) may incorporate or function as a casing closer 296. For example, casing cutter 116 (FIG. 6) may include a heated component (e.g. blade 308) which heat seals and cuts tubular casing 104 simultaneously.

FIG. 14 shows a schematic illustration of apparatus 100. In some embodiments, apparatus 100 may include a controller 320 that directs the operation of apparatus 100. For example, controller 320 may direct the operation of one or more (or all) actuators. Controller 320 may control some actuators based at least in part on signals received from one or more sensors of apparatus 100. This may permit many aspects of apparatus 100 to be automated, minimizing the effort and labor required by the operator, if any.

As shown, controller 320 may be configured to control the operation of one or more (or all) of grabbing element actuator(s) 248, casing grabber traversal actuator 256, casing grabber retreat actuator 276, finishing assembly traversal actuator 280, and casing cutter actuator 312. For example, controller 320 may be communicatively coupled to one or more or all of these actuators 248, 256, 276, 280, 312 by wire or wirelessly to send control signals to direct their actuation. Alternatively or in addition, controller 320 may be communicatively coupled to one or more fluidic devices (e.g. pumps and/or valves) to direct the movement of fluid (e.g. gas and/or liquid) to one or more or all of actuators 248, 256, 276, 280, 312 (e.g. where these actuator(s) are fluidic devices). Accordingly, controller 320 may be said to be "in control of" or "controllably coupled to" one or more or all of actuators 248, 256, 276, 280, 312—whether by direct electrical signals, or by electrical signals to intermediary fluidic device(s).

In some embodiments (and not others), controller 320 may be communicatively coupled (e.g. by wire or wirelessly) to one or more sensors of apparatus 100, such as for example product placement sensor 192. Controller 320 may direct the operation of one or more or all of actuators 248, 256, 276, 280, 312 based on signals from such sensors. For example, controller 320 may direct casing cutter actuator(s) 312 to cut tubular casing 104 in response to a signal from product placement sensor 192 indicating that a product has been fully received in tubular casing 104.

FIG. 15 shows an example schematic of a controller 320. Generally, controller 320 can be a server computer, desktop computer, notebook computer, tablet, PDA, smartphone, integrated circuit, special purpose computing device (e.g. Arduino™ device), or another computing device. In at least one embodiment, controller 320 includes a connection with a network 352 such as a wired or wireless connection to the Internet or to a private network. In some cases, network 352 includes other types of computer or telecommunication networks.

In the example shown, controller 320 includes a memory 324, an application 328, an output device 332, a display device 336, a secondary storage device 340, a processor 344, and an input device 348. In some embodiments, controller 320 includes multiple of any one or more of memory 324, application 328, output device 332, display device 336, secondary storage device 340, processor 344, and input device 348. In some embodiments, controller 320 does not include one or more of applications 328, second storage devices 340, network connections, input devices 348, output devices 332, and display devices 336.

Memory 324 can include random access memory (RAM) or similar types of memory. Also, in some embodiments, memory 324 stores one or more applications 328 for execution by processor 344. Applications 328 correspond with software modules including computer executable instructions to perform processing for the functions and methods described above and below. Secondary storage device 340 can include a hard disk drive, floppy disk drive, CD drive, DVD drive, Blu-ray drive, solid state drive, flash memory or other types of non-volatile data storage.

In some embodiments, controller 320 stores information in a remote storage device, such as cloud storage, accessible across a network, such as network 352 or another network. In some embodiments, controller 320 stores information distributed across multiple storage devices, such as memory 324 and secondary storage device 340 (i.e. each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 344 can execute applications, computer readable instructions or programs. The applications, computer readable instructions or programs can be stored in memory 324 or in secondary storage 340, or can be received from remote storage accessible through network 352, for example. When executed, the applications, computer readable instructions or programs can configure the processor 344 (or multiple processors 344, collectively) to perform the acts described herein with reference to the sequence of steps described in connection with FIGS. 1-9, for example.

Input device 348 can include any device for entering information into controller 320. For example, input device 348 can be a keyboard, key pad, cursor-control device, touch-screen, camera, or microphone. Input device 348 can also include input ports and wireless radios (e.g. Bluetooth®, or 802.11x) for making wired and wireless connections to external devices, such as for example product placement detector 180 (e.g. sensor 192).

Display device 336 can include any type of device for presenting visual information. For example, display device 336 can be a computer monitor, a flat-screen display, a projector or a display panel. In some embodiments, display device 336 comprises one or more lights or display panels which provide guidance to a user operator, such as when apparatus 100 is clear for them to deposit another product into the product feed conduit.

Output device 332 can include any type of device for presenting a hard copy of information, such as a printer for example. Output device 332 can also include other types of output devices such as speakers, for example. In at least one embodiment, output device 332 includes one or more of output ports and wireless radios (e.g. Bluetooth®, or 802.11x) for making wired and wireless connections to external devices such as one or more or all of actuators 248, 256, 276, 280, or 312 (or fluidic devices associated with these actuators).

FIG. 15 illustrates one example hardware schematic of a controller 320. In alternative embodiments, controller 320 contains fewer, additional or different components. In addition, although aspects of an implementation of controller 320 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

A method of packaging a product in a tubular casing is now described in connection with FIGS. 1-9. Reference is implicitly made to FIGS. 14-15 whenever controller 320 is mentioned.

FIG. 1 shows a starting position of apparatus 100. Controller 320 may direct (i.e. by sending control signals to the actuator or to a fluidic device associated with the actuator) casing grabber traversal actuator 256 to move casing grabber 112 to its downstream position as shown in FIG. 2. Controller 320 may then direct grabbing element(s) 144 to grasp casing upstream end 136 as shown in FIG. 3. Controller 320 may then direct casing grabber traversal actuator 256 to move casing grabber 112 to its upstream position as shown in FIG. 4. Controller 320 may then direct retreat actuator 276 to move casing grabber 112 a short distance downstream, allowing tubular casing 104 to relax as shown in FIG. 5. Controller 320 may then direct finishing assembly traversal actuator 280 to move finishing assembly 172 to its active position as shown in FIG. 6. Controller 320 may then receive a signal from product placement detector 180 (e.g. from sensor 192) indicating that product 184 is fully inserted into tubular casing 104, as shown in FIG. 7. In response to the signal from product placement detector 180, controller 320 may then direct casing cutter actuator 312 to activate, whereby casing segment 168 (which contains product 184) is severed from the remainder of tubular casing 104, as shown in FIGS. 8 and 9.

Referring to FIG. 14, in some embodiments (and not others), apparatus 100 may be oriented such that casing grabber traversal axis 268 is oriented at a (non-zero) angle 356 to vertical (i.e. non-zero angle to the direction of gravity). For example, traversal axis 268 may be oriented at a non-zero angle 356 to vertical and non-zero angle to horizontal. This can allow an object deposited into tubular casing 104 (FIG. 1) through product feed conduit 108 (FIG. 1) to move into tubular casing 104 (FIG. 1) by gravity, while also permitting the casing segment 168 (FIG. 1, containing the product 184, FIG. 1) when severed to fall away from apparatus 100, clearing apparatus 100 to package a subsequent product. In some embodiments, angle 356 is between 5 degrees and 60 degrees, such as for example between 10 degrees and 55 degrees as shown.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A method of packing product in a tubular casing, the method comprising:
 a) providing a continuous length of tubular casing, the tubular casing having a casing upstream end;
 b) providing an expansion plug within the tubular casing, the expansion plug having a casing discharge end, the casing upstream end located proximate the casing discharge end;
 c) grasping the casing upstream end with a casing grabber;
 d) moving the casing grabber, with the grasped casing upstream end, away from the expansion plug towards an outlet end of a product feed conduit, the casing grabber holding the casing upstream end open;
 e) feeding product from the outlet end of the product feed conduit in a downstream direction through the casing upstream end into the tubular casing, while the casing upstream end is held open by the casing grabber, and
 f) cutting the tubular casing at a cutting position downstream of the product to sever an upstream casing segment from the remaining continuous length of tubular casing.

Item 2: The method of any preceding item, wherein:
 the tubular casing has a transverse relaxed diameter, and the expansion plug has a transverse plug diameter greater than the transverse relaxed diameter.

Item 3: The method of any preceding item, wherein:
 the tubular casing has a transverse relaxed diameter, and in d) the casing grabber holds the casing upstream end open with a transverse grasped diameter greater than the transverse relaxed diameter.

Item 4: The method of any preceding item, wherein:
 the tubular casing has an elastically expansible diameter.

Item 5: The method of any preceding item, further comprising:
 g) after (d) and before (e), moving the casing grabber, with the grasped casing upstream end, towards the expansion plug.

Item 6: The method of any preceding item, wherein:
 step (g) reduces longitudinal tension on the tubular casing between the casing grabber and the expansion plug.

Item 7: The method of any preceding item, further comprising:
 before (f), detecting that the product has been inserted into the tubular casing.

Item 8: The method of any preceding item, wherein:
 said detecting comprises detecting that a downstream end of the product is positioned proximate the expansion plug.

Item 9: The method of any preceding item, wherein:
 (d) comprises moving the tubular casing through an annular passage between the expansion plug and a plug holder.

Item 10: The method of any preceding item, wherein:
 (d) comprises moving the tubular casing between an interface of expansion plug bearings located inside the tubular casing and outer bearings located outside the tubular casing.

Item 11: The method of any preceding item, wherein:
 (c) comprises activating at least one clamp of the casing grabber to grasp the casing upstream end.

Item 12: The method of any preceding item, further comprising:
 after (d), closing the tubular casing at or upstream of the cutting position.

Item 13: The method of any preceding item, wherein:
 after (d), the tubular casing extends longitudinally at a 10-55 degree angle to vertical between the casing grabber and the expansion plug, and
 after (f), the upstream casing segment with the product inside falls away from the expansion plug by gravity.

Item 14: A product packing apparatus for tubular casing, the apparatus comprising:
 an outer expansion plug retainer;
 an inner expansion plug retained by the outer expansion plug retainer, clearance between the inner expansion plug and outer expansion plug retainer providing accommodation for a tubular casing to pass between the inner expansion plug and outer expansion plug retainer;
 a product feed conduit positioned upstream of the one or more grabber actuators;
 a casing grabber positioned at least in part between the inner expansion plug and the product feed conduit, the casing grabber comprising a traversal actuator controllable to move the casing grabber from a downstream position proximate the inner expansion plug to an upstream position proximate the product feed conduit; and
 a casing cutter controllable to perform a cutting action at a cutting position located between the inner expansion plug and the product feed conduit.

Item 15: The apparatus of any preceding item, wherein:
  each of the inner expansion plug and the outer expansion plug retainer comprises bearing at an interface of the inner expansion plug and the outer expansion plug.
Item 16: The apparatus of any preceding item, wherein:
  the casing grabber comprises at least one clamp.
Item 17: The apparatus of any preceding item, further comprising:
  a product end stop positioned between the casing cutter and the product feed conduit.
Item 18: The apparatus of any preceding item, further comprising:
  a product placement detector positioned between the casing cutter and the product feed conduit.
Item 19: The apparatus of any preceding item, wherein:
  the inner expansion plug comprises an alignment post.
Item 20: The apparatus of any preceding item, further comprising:
  a controller having at least one processor and a memory storing computer executable instructions that when executed configure the at least one processor to collectively:
    a) direct the traversal actuator to move the casing grabber to the downstream position,
    b) while in the downstream position, direct one or more grabber actuators to activate the casing grabber;
    c) while the casing grabber is activated, direct the traversal actuator to move the casing grabber to the upstream position; and
    d) direct the casing cutter to perform the cutting action.
Item 21: The apparatus of any preceding item, wherein the computer executable instruction further configure, when executed, further configure the at least one processor to collectively:
    c1) after c) and before d) receive a signal from a product placement detector.
Item 22: The apparatus of any preceding item, wherein the computer executable instruction further configure, when executed, further configure the at least one processor to collectively:
    c1) after c) and before d), direct the traversal actuator or another actuator to retreat the casing grabber by a retreat distance towards the downstream position.
Item 23: The apparatus of any preceding item, wherein:
  the traversal actuator is controllable to move the casing grabber from the downstream position proximate the inner expansion plug along a traversal axis to the upstream position proximate the product feed conduit, wherein the traversal axis is oriented at an angle of 10 to 55 degrees to vertical.

The invention claimed is:

1. A product packing apparatus fora tubular casing, the apparatus comprising:
  an outer expansion plug retainer;
  an inner expansion plug retained by the outer expansion plug retainer, clearance between the inner expansion plug and the outer expansion plug retainer providing accommodation for a tubular casing to pass between the inner expansion plug and the outer expansion plug retainer;
  a product feed conduit positioned upstream of the inner expansion plug;
  a casing grabber positioned at least in part between the inner expansion plug and the product feed conduit, the casing grabber comprising a traversal actuator controllable to move the casing grabber from a downstream position proximate to the inner expansion plug to an upstream position proximate to the product feed conduit;
  a casing cutter controllable to perform a cutting action at a cutting position located between the inner expansion plug and the product feed conduit; and
  a controller having at least one processor and a memory storing computer executable instructions that, when executed, configure the at least one processor to collectively:
    a) direct the traversal actuator to move the casing grabber to the downstream position;
    b) while in the downstream position, direct one or more grabber actuators of the casing grabber to activate;
    c) while the one or more grabber actuators is activated, direct the traversal actuator to move the casing grabber to the upstream position;
    d) direct the casing cutter to perform the cutting action; and
    c1) after c) and before d), direct the traversal actuator or another actuator to retreat the casing grabber by a retreat distance towards the downstream position.

2. The apparatus of claim 1, wherein:
  each of the inner expansion plug and the outer expansion plug retainer comprises a bearing at an interface of the inner expansion plug and the outer expansion plug retainer.

3. The apparatus of claim 1, wherein:
  the casing grabber comprises at least one clamp.

4. The apparatus of claim 1, further comprising:
  a product end stop positioned between the casing cutter and the product feed conduit.

5. The apparatus of claim 1, further comprising:
  a product placement detector positioned between the casing cutter and the product feed conduit.

6. The apparatus of claim 1, wherein the computer executable instructions, when executed, further configure the at least one processor to collectively:
  c1) after c) and before d), receive a signal from a product placement detector.

7. The apparatus of claim 1, wherein:
  the traversal actuator is controllable to move the casing grabber from the downstream position proximate to the inner expansion plug along a traversal axis to the upstream position proximate to the product feed conduit, wherein the traversal axis is oriented at an angle of 10 to 55 degrees relative to vertical.

* * * * *